United States Patent [19]
Guerriero et al.

[11] 3,913,932
[45] Oct. 21, 1975

[54] WHEEL SUSPENSION FOR MOTOR VEHICLE

[75] Inventors: Charles P. Guerriero, Dearborn Heights; Donald K. Hayward, Dearborn, both of Mich.

[73] Assignee: Ford Motor Company, Dearborn, Mich.

[22] Filed: July 8, 1974

[21] Appl. No.: 486,731

[52] U.S. Cl. ............................. 280/124 A; 267/40
[51] Int. Cl.² .......................................... B60G 11/46
[58] Field of Search ....... 280/124 R, 124 A; 267/40, 267/41

[56] References Cited
UNITED STATES PATENTS

| | | | |
|---|---|---|---|
| 1,361,047 | 12/1920 | Gregory | 280/124 |
| 1,711,881 | 5/1929 | Fornaca | 280/124 |
| 2,460,106 | 1/1949 | Rowland | 280/124 X |

*Primary Examiner*—Philip Goodman
*Attorney, Agent, or Firm*—Clifford L. Sadler; Keith L. Zerschling

[57] ABSTRACT

The present disclosure relates to an independent rear suspension system for a motor vehicle having front wheel drive. Left and right road wheels are rotatably supported by left and right wheel support members. The wheel support members are positioned relative to a vehicle body by means of a transverse single leaf spring that is secured by a pair of clamps to the body and by pivots to the wheel support members. Vertically extending telescopic shock absorbers are rigidly secured at their lower ends to the wheel support members and pivotally connected to vehicle body structure at their upper ends. The wheels are nonsteerable and are nondriving. The leaf spring and shock absorbers determine the vertical jounce and rebound path of the wheels. They also provide the sole means for transmitting brake torque reaction to the vehicle body.

5 Claims, 4 Drawing Figures

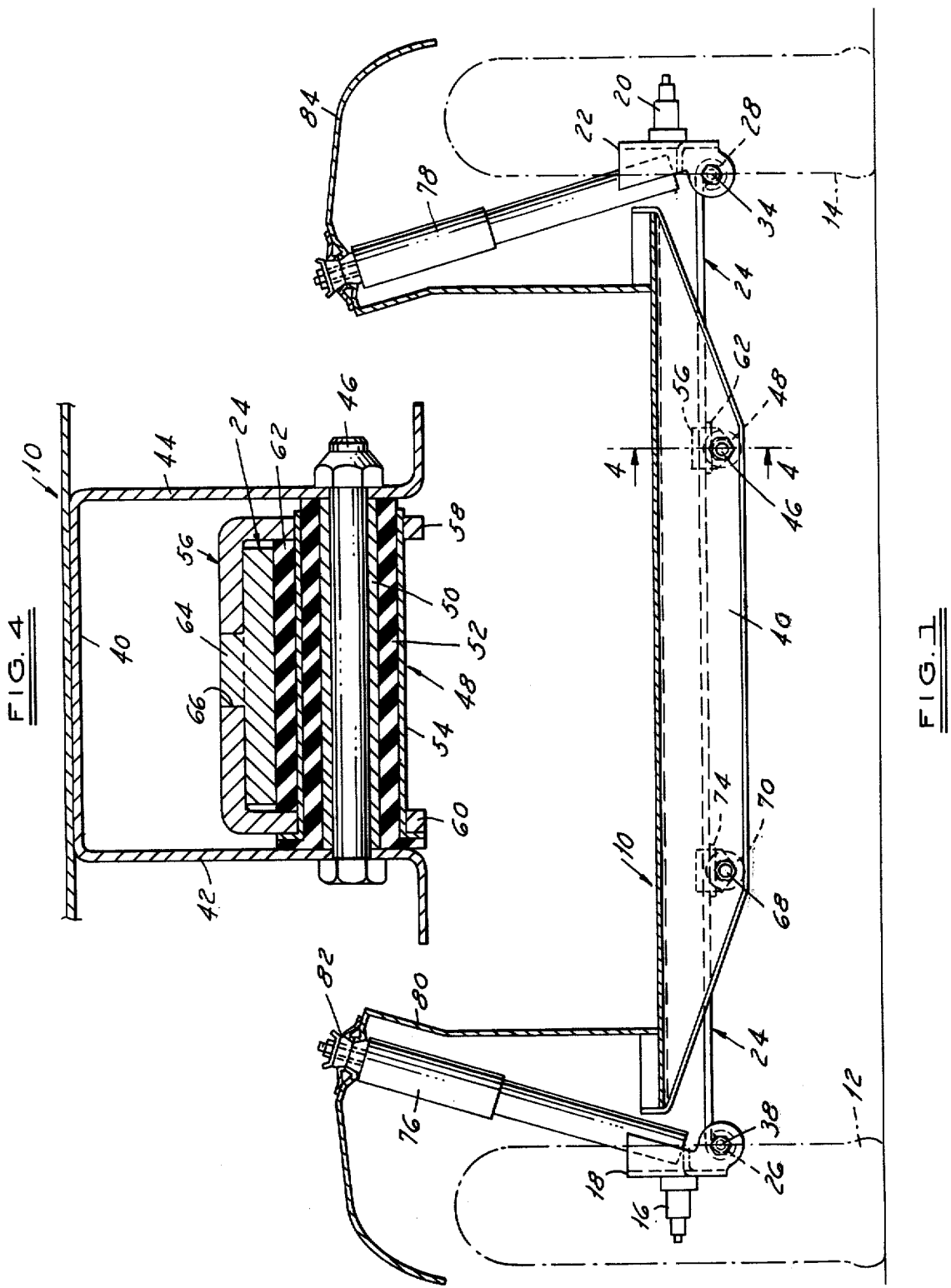

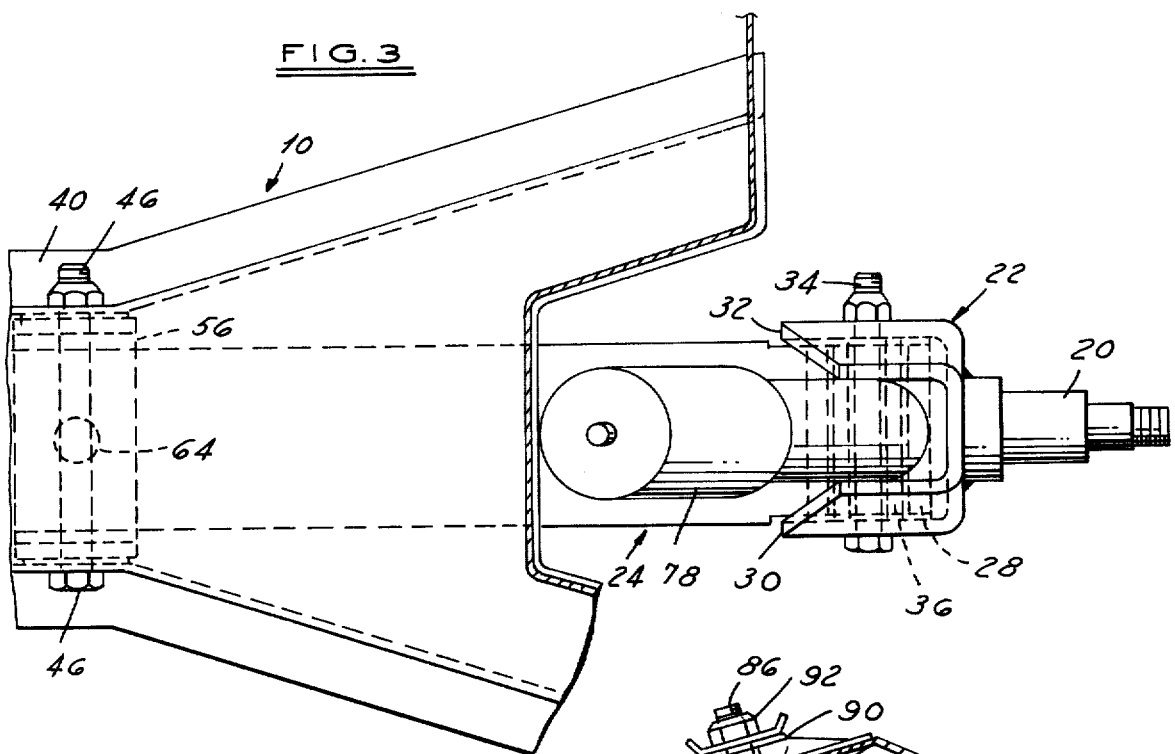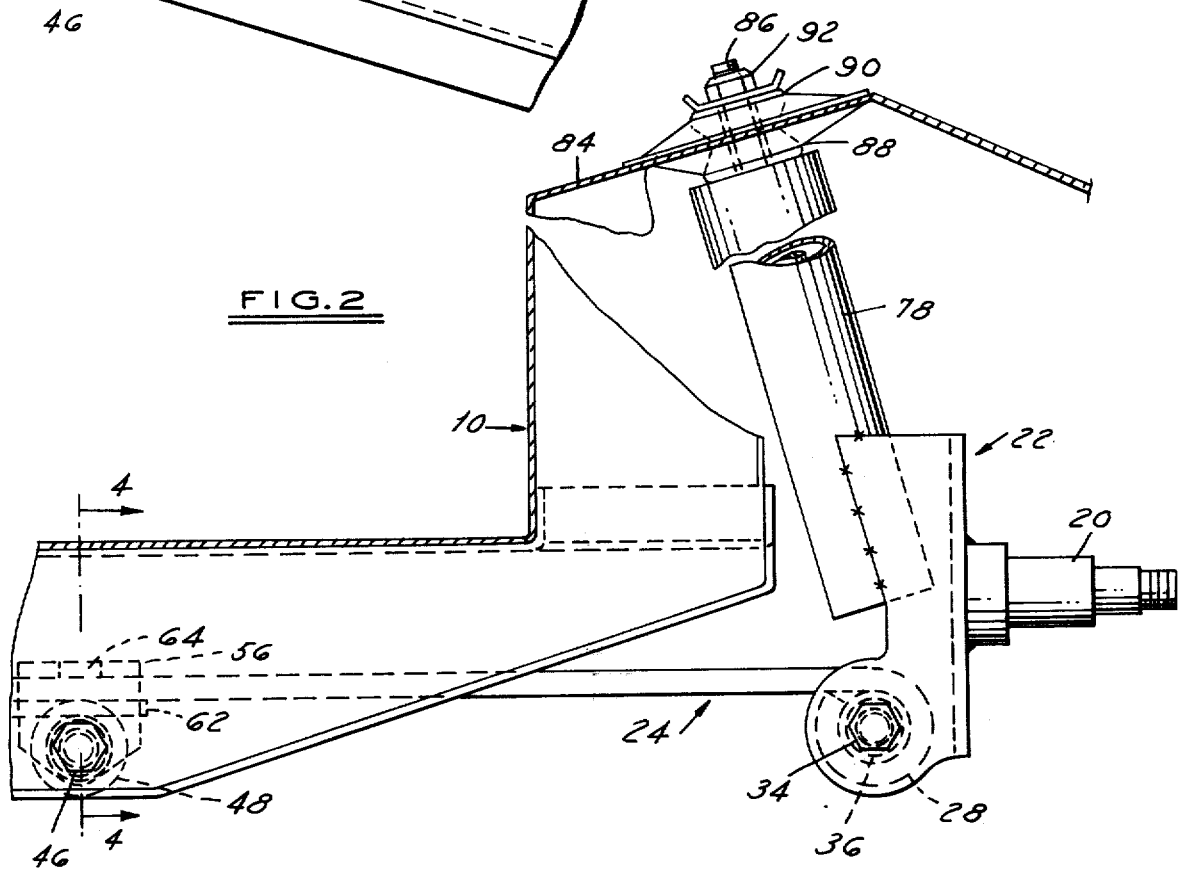

WHEEL SUSPENSION FOR MOTOR VEHICLE

BACKGROUND AND SUMMARY OF THE DISCLOSURE

It is an object of the present invention to provide an independent rear suspension system for a passenger car having front wheel drive. The rear wheels are nonsteerable and nondriving. The suspension is particularly adapted to light weight compact cars.

According to the invention, left and right road wheels are rotatably supported by left and right wheel support members. A transverse leaf spring has eyes formed at its outer ends which are pivotally connected to the left and right wheel supports. A pair of structures clamp the leaf spring to a pair of pivots secured to a vehicle frame member. Left and right vertically extending telescopic shock absorbers have their lower ends rigidly secured to the wheel support members and their upper ends pivotally connected to vehicle body structure.

The transverse left spring, in addition to providing resilient support for the vehicle body, functions as a suspension link to determine the jounce and rebound paths of the wheels. The shock absorbers in addition to damping wheel movements also function as suspension links which determine wheel camber angles.

Brake torque reaction is transmitted from the wheel support members to the body through the leaf spring and the shock absorbers. No longitudinally extending struts or arms are employed as torque reaction members.

A suspension in accordance with this invention is characterized by its simplicity of construction. The suspension is appropriate for application to light weight compact cars.

BRIEF DESCRIPTION OF THE DRAWINGS

The many objects and advantages of a vehicle suspension construction in accordance with this invention will become apparent upon consideration of the following detailed description and accompanying drawings, in which:

FIG. 1 is a rear elevational view, partly in section, of a novel rear suspension for a motor vehicle;

FIG. 2 is an enlarged elevational view of the right hand portion of the suspension of FIG. 1;

FIG. 3 is a top plan of the suspension portion shown in FIG. 2; and

FIG. 4 is a sectional view taken along section line 4—4 of FIG. 2.

DETAILED DESCRIPTION OF A PREFERRED EMBODIMENT

Referring now to the drawings, wherein the presently preferred form of this invention is illustrated. FIG. 1 shows a motor vehicle body 10 supported on left and right road wheels 12 and 14 by novel wheel suspension means.

The left wheel 12 is rotatably supported on the stub axle portion 16 of the left wheel support member 18. In a similar manner right wheel 14 is rotatably supported on a stub axle 20 which forms a part of the right wheel support 22. The stub axles 16 and 20 are rigid parts of the wheel supports 18 and 22, respectively. The members 18 and 22, in addition to supporting the wheels 12 and 14, also support the brakes for the wheels.

A dual purpose single leaf spring 24 is provided for resiliently supporting the body 10 upon the wheels 12 and 14 and for determining jounce and rebound wheel paths. The transverse single leaf spring 24 has its left and right ends curled over to form eyes 26 and 28. The eye 28 at the right end of the spring 24 is positioned between spaced flange portions 30 and 32 of the right wheel support member 22. A resilient bushing 36 of generally cylindrical construction is secured within the eye 28 by a press fit. The spring eye 28 and resilient bushing 36 are connected to the wheel support 22 by a pivot bolt 34 that extends through the flanges 30 and 32.

A like construction is used at the left end of the spring 24. The spring eye 26 is situated between a pair of flange portions of the wheel support member 18 and a resilient bushing is situated within the eye. A bolt 38 extends through the bushing in the spring eye 26 and pivotally secures the spring end to the left wheel support member 18.

The vehicle body 10 includes a transversely extending frame member 40 having a generally channel shape with parallel vertical walls 42 and 44. A major portion of the length of the transverse leaf spring 24 is situated within the frame member 24 and between the walls 42 and 44. The spring 24 is pivotally connected to the transverse frame member 40 at two spaced locations to accommodate flexing of the spring.

The construction of the right spring attachment is shown in cross section in FIG. 4 and it includes a resilient bushing 48 that extends between the vertical walls 42 and 44 of the member 40. A pivot bolt 46 connects the bushing assembly 48 to the frame member 40. The bushing 48 includes an inner metal sleeve 50 that is surrounded by a rubber cylinder 52 and an outer metal sleeve 54 that surround the rubber 52.

A U-shape member 56 has depending leg portions 58 and 60 that are provided with apertures and the resilient bushing assembly 48 is secured in the apertures by a press fit. The leaf spring 24 is situated between the depending portions 58 and 60 of the U-shape member 58. The spring 24 rests upon a rubber pad 62 which in turn rests upon the resilient bushing 48. In order to secure the leaf spring 24 against lateral displacement, a button shape element 64 is welded to the upper surface of the spring. The button 64 fits within a hole 66 formed in the U-shape member 56.

In a similar manner a second structure pivotally connects transverse leaf spring 24 to the frame member 40. It includes a bolt 68 that extends through a bushing 70 which supports a U-shape member 72. The spring 24 extends through the U-shape member 72 and rests upon a resilient pad 74. The U-shape member 72 is provided with a hole to receive a button shape element welded to the spring 24. The button secures the spring 24 against lateral displacement.

A pair of upwardly extending telescopic hydraulic shock absorbers 76 and 78 complete the suspension. The right shock absorber 78 is rigidly secured to the right wheel support member 22 and pivotally connected at its upper end to a right body panel 84. As seen in FIG. 2, the pivotal connection between the shock absorber 78 and the body panel 84 includes a threaded stud 86 formed on the end of the piston rod of the shock absorber. The stud 86 extends through an aperture in the body panel 84. A pair of annular rubber elements 88 and 90 are situated on either side of the body panel 84 and surround the threaded stud 86. A nut 92 is tightened on the end of the stud 86 to secure the rubber pieces 88 and 90 into snug engagement with the body panel 84.

Similarly, left shock absorber 76 has its lower end welded or otherwise rigidly secured to the left wheel support member 18. The upper end of the shock absorber 76 is pivotally connected to a sheet metal body panel 80 by a bayonet type mount 80 which includes flexible rubber elements.

OPERATION

The vehicle suspension illustrated in the drawings is particularly adapted to a light weight compact vehicle having front wheel drive. The jounce and rebound paths of the wheels 12 and 14 are determined by the transverse leaf spring 24 and the shock absorbers 76 and 78. The leaf spring 24 performs the dual functions of resiliently supporting the vehicle body 10 on the wheels 12 and 14 and of acting as suspension links to position the wheels. The shock absorbers 76 and 78 also function, in part, as suspension links. They determine the camber angles of the wheels 12 and 14.

The pivotal connections at the spring eyes 26 and 28 as well as the pivotal connections between the spring 24 and the frame member 40 permit the spring to flex freely along its length during jounce and rebound movement of the wheels 12 and 14.

Brake torque reaction is transmitted from the wheels 12 and 14 and wheel supports 18 and 22 to the vehicle body 10 through the leaf spring 24 and the shock absorbers 76 and 78. No longitudinal suspension arms or struts are employed in this suspension for transmitting brake torque to the vehicle body.

In summary, the present invention provides an independent rear suspension for the nondriving, nonsteerable road wheels of a motor vehicle that is particularly characterized by its simplicity of construction.

The foregoing description presents the presently preferred embodiment of this invention. Details of construction are disclosed for illustrative purposes and are not limits of the invention. Modifications and alterations may occur to those skilled in the art that will come within the scope and spirit of the following claims:

We claim:

1. An independent rear suspension for a motor vehicle having a vehicle body and left and right non-driving, nonsteerable road wheels;
    suspension means interconnecting said vehicle body and said road wheels;
    said suspension means including left and right wheel support members rotatably supporting said left and right road wheels about axes of rotation that are fixed relative to said wheel support members;
    a transverse leaf spring and means securing said spring to said vehicle body;
    left and right outer pivot means connecting the left and right outer ends of said leaf spring to said left and right wheel support members;
    said left and right outer pivot means having longitudinal pivot axes that are fixed with respect to the axes of rotation of said left and right wheels, respectively;
    left and right upwardly extending telescopic hydraulic shock absorbers;
    said left and right shock absorbers having their lower ends rigidly secured to said left and right wheel support members, respectively;
    means pivotally connecting the upper ends of said left and right shock absorbers to said vehicle body;
    said transverse spring and said left and right shock absorbers providing the sole means that defines the jounce and rebound path of said left and right wheels.

2. An independent rear suspension according to claim 1 and including:
    left and right inner pivot means connecting said spring to said vehicle body at spaced locations.

3. An independent rear suspension according to claim 1 and including:
    said spring comprising a single spring leaf having spring eyes formed at its left and right ends;
    said left and right outer pivot means pivotally connecting said left and right spring eyes to said left and right wheel support members.

4. An independent rear suspension according to claim 1 and including:
    said spring comprising a single spring leaf having spring eyes formed at its left and right ends;
    said left and right outer pivot means pivotally connecting said left and right spring eyes to said left and right wheel support members;
    left and right inner pivot means connecting said spring to said vehicle body at spaced locations.

5. An independent suspension system for a motor vehicle having a vehicle body and left and right non-steerable, nondriving road wheels;
    suspension means interconnecting said left and right wheels to said vehicle body;
    said suspension means including left and right wheel support members rotatably supporting said left and right road wheels for rotation about axes that are fixed relative to said wheel support members;
    a transverse single leaf spring having spring eyes formed at its left and right ends;
    left and right outer pivot means pivotally connecting said left and right spring eyes to said left and right wheel support members;
    said left and right outer pivot means providing longitudinal pivot axes that are fixed relative to the axes of rotation of said left and right road wheels, respectively;
    said vehicle body having a transverse frame member of generally channel shape construction;
    said frame member having fore and aft parallel vertical walls;
    a major portion of the length of said transverse leaf spring being disposed within said channel shape frame member and between said fore and aft walls;
    left and right resilient pivot bushings pivotally connected to said fore and aft walls;
    left and right support means securing said leaf spring to said bushings;
    left and right telescopic hydraulic shock absorbers having their lower ends rigidly secured to said left and right wheel support members;
    said shock absorbers having their upper ends pivotally connected to said vehicle body;
    said transverse spring and said left and right shock absorbers providing the sole means that defines the jounce and rebound path of said left and right wheels.

* * * * *